United States Patent [19]
Arvidsson et al.

[11] Patent Number: 5,795,073
[45] Date of Patent: Aug. 18, 1998

[54] RADIAL AND THRUST BEARING SYSTEM

[76] Inventors: Thomas Arvidsson, Sherman St., Muncy, Pa. 17756; Steve A. Rowland, 2995 Le Courbusier, Laval, Quebec, Canada, H7L 3M3

[21] Appl. No.: 617,338

[22] Filed: Mar. 18, 1996

(Under 37 CFR 1.47)

Related U.S. Application Data

[63] Continuation of PCT/IB94/00279, Sep. 16, 1994.
[51] Int. Cl.⁶ ............................................ F16C 32/06
[52] U.S. Cl. ................................... 384/110; 384/107
[58] Field of Search ................... 384/99, 100, 107, 384/108, 109, 110, 111

[56] References Cited

U.S. PATENT DOCUMENTS

| | | | |
|---|---|---|---|
| 3,391,965 | 7/1968 | Lindeboom | 384/110 |
| 3,674,355 | 7/1972 | Yearout et al. | 384/110 |
| 3,917,366 | 11/1975 | Mason | 384/110 |
| 4,919,547 | 4/1990 | Schwartzman | 384/107 X |

FOREIGN PATENT DOCUMENTS

| | | |
|---|---|---|
| 8902604 | 4/1991 | Sweden . |
| 1012839 | 12/1965 | United Kingdom . |
| 9102174 | 2/1991 | WIPO . |

*Primary Examiner*—Thomas R. Hannon
*Attorney, Agent, or Firm*—Helfgott & Karas, P C.

[57] ABSTRACT

Radial and thrust bearing system with two hydrostatic bearings axially movable relative to a surrounding bearing housing. Each bearing includes a flange connected to the axle. The flange includes a pressure surface and a collar chamber bearing which has a surface facing the pressure surface and in it a collar groove, the surface and the pressure surface together forming internal and external tightening slots on either side of the collar groove. The pressure surface and the groove together forming a collar chamber to which hydraulic fluid is fed under pressure from a hydraulic fluid source. The collar chamber bearing with the bearing housing form a chamber that is put under hydraulic pressure for pressing the collar chamber bearing against the pressure surface, both collar chamber bearings being pressed in mutually opposite directions. A pilot valve is arranged with a sensing transmitter for positioning the axle relative to the bearing housing to control the amount of hydraulic fluid supplied to the respective collar chamber and to control the hydraulic pressure acting on the respective bearing in order to admit loads varying in magnitude and direction on the axle and maintaining axial displaceability of the axle. At least one flange is demountable from the axle. The pressure surfaces are turned in mutually opposite directions, each forming an angle with the axle which is non-perpendicular.

4 Claims, 1 Drawing Sheet

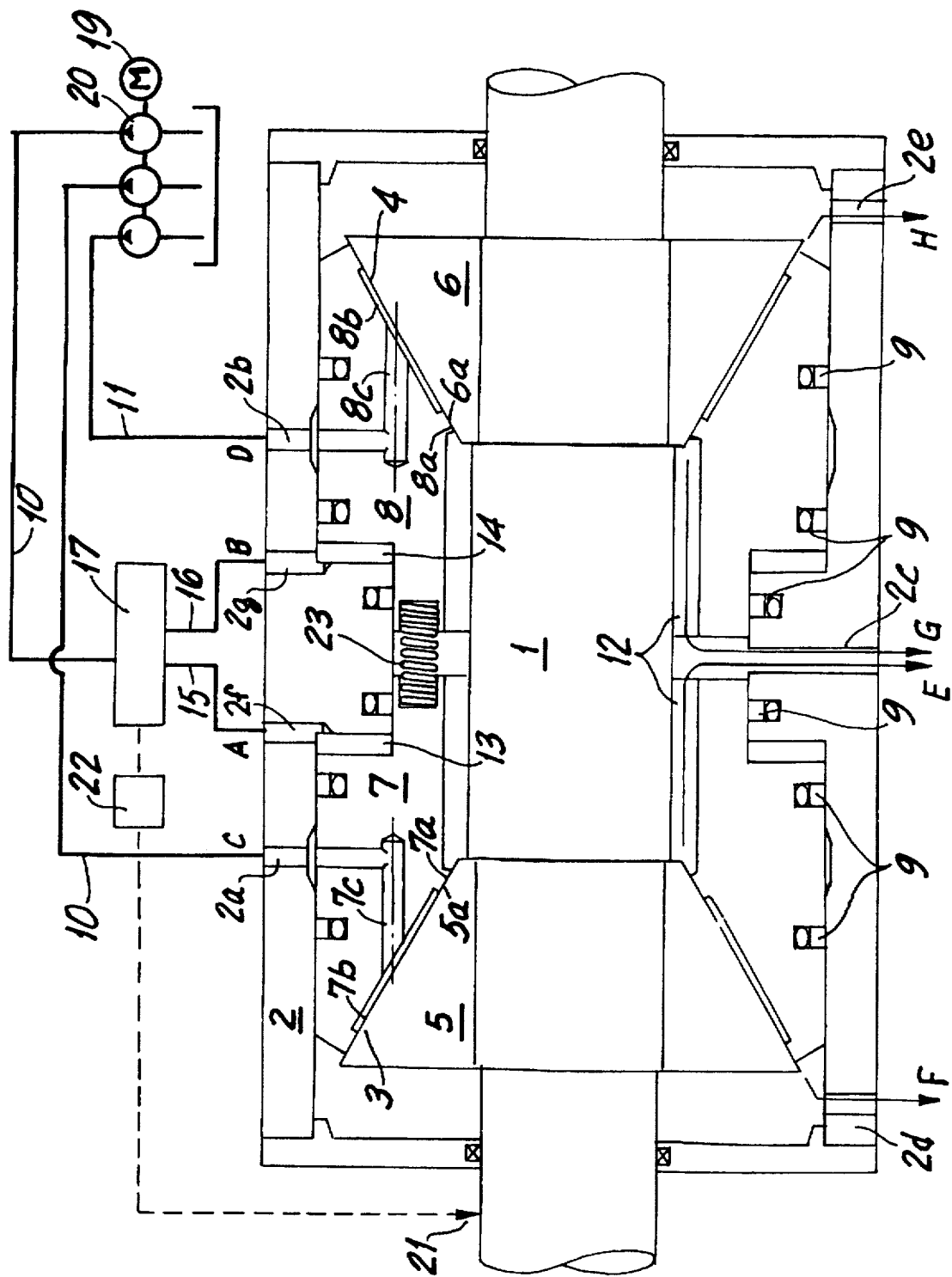

RADIAL AND THRUST BEARING SYSTEM

This application is a continuation of PCT/IB94/00279, Sep. 16, 1994.

The present invention relates to a radial and thrust bearing system in accordance with the preamble to the accompanying claim 1.

There exists a need within many technical fields for an axially adjustable bearing system, which is capable of carrying large and varying axial loads. One example of such a field is cellulose engineering, where there is a type of axial mill for various applications, in which mill axial forces as great as 100 tons can be generated while high demands are made on an axial positioning accuracy to obtain a precise grinding gap.

Such a thrust bearing system is previously known through the PCT-publication WO 88/03611, the introduction of which teaches the demands generally posed upon hydrostatic bearing systems and other previously known hydrostatic thrust bearing systems.

The thrust bearing system according to said PCT-publication includes a hydrostatic thrust bearing on each side of a flanged pressure plate, which is rigidly connected to or integrally manufactured with the axle. Even though this known thrust bearing system fulfills its task fully satisfactorily, a desire to reduce the complexity of the bearing system remains.

A similar thrust bearing system is known through WO 91/02174, in which system considerable simplifications has been made over the previously mentioned publication.

It is obvious for a person skilled in the art that both of the above thrust bearing systems are fully dependent on a well fuctioning radial bearing. This means that the capacity of the hydrostatic bearing as regards e.g. rotation speed and rigidity is limited by the radial bearing in this respect.

The present invention is intended to bring about a radial and thrust bearing system according to the introductory parts of this application, in which system the thrust bearings incorporate a radial function and, therefore, considerably improve the system capacity from many points of view while contributing to great simplifications in the production thereof.

According to the characterizing features of this invention, this purpose is achieved by a radial and thrust bearing system including two thrust bearings each comprising a flange joined to the shaft, wherein at least one of the flanges can be removed from the flange and that the pressure surfaces face in mutually opposite directions and each form an angle with the shaft which is essentially non-perpendicular (90°).

The invention enables direct power transmission between bearing housings and thrust and axial bearings, i.e. fewer components and better concentricity than was previously possible. Furthermore, a reduction of the length of the power flow is achieved by means of the invention, i.e. reduced extension and compression respectively of the bearing parts, which is significant when the radial and axial load is great and the precision demands are high. The invention also brings about a closer positioning of the thrust and radial bearings relative each other, which reduces the risk of vibrations.

The present invention also includes an annular groove that is divided into a number of separate pockets each fed with hydraulic fluid under pressure from a source of hydraulic fluid. According to the present invention each of the two flanges include a pressure surface, wherein the pressure surfaces each form an angle of between 15° and 75° with the shaft.

Further advantages of the invention will appear from the following description with reference to the drawing, which schematically shows an axial cross-section of a bearing system according to the invention.

In the drawing the reference number 1 indicates an axle, which is mounted in a bearing housing 2.

The bearing device includes two hydrostatic radial and thrust bearings 3, 4, axially movable relative to the bearing housing 2. Each thrust bearing includes a flange 5 and 6 respectively, which is rigidly connected to the axle 1, and a collar chamber bearing 7, 8. The collar chamber bearings 7, 8 are sealed from the bearing house by means of gasket rings 9. The connection between the axle 1 and each flange is accomplished by means of a hydraulic bush of familiar type, but can be achieved through other means.

The flange 5 and 6 respectively defines a pressure surface $5a, 6a$ in each thrust bearing 3, 4, which pressure surface forms an angle with the axle 1. Further explanation of what is achieved through this solution will follow. According to the invention, the surfaces $5a, 6a$ are turned in mutually opposite directions.

The collar chamber bearings 7, 8 display a surface $7a$ and $8a$ respectively facing the pressure surface $5a, 6a$. There is a collar groove $7b, 8b$ in each of these surfaces, the pressure surface and the collar groove together form a collar chamber; for simplicity, these chambers have the same reference numbers as the collar grooves $7b, 8b$. The collar chamber $7b$ communicates through channels $7c, 2a$ in the collar chamber bearing 7 and the bearing housing, respectively, and over a circuit 10 with a hydraulic fluid source in the drawing, preferably a constant flow pump. Correspondingly, the collar chamber $8b$ communicates through channels $8c, 2b$ and a circuit 11 with an exhibited hydraulic fluid source, also preferably a constant flow pump. The flow in the circuits 10, 11 is indicated as C and D respectively on the drawing.

Internal and external tightening slots are formed on each side of the collar chambers $7b$ and $8b$, respectively, by means of which slots the supplied hydraulic fluid is evacuated under considerable pressure fall, which produces the necessary hydraulic pressure in the collar chambers $7b, 8b$ to support a radial and axial load on the axle 1. The hydraulic fluid flows E and G from the internal tightening slots flow over a cylindrically shaped slot 12 between the axle 1 and each collar chamber bearing 7, 8 and via a channel $2c$ in the bearing housing 2. In a similar way, the hydraulic fluid flows F and H from the external tightening slots flow over channels $2d$ and $2e$ in the bearing housing 2.

By means of a stepped increase in the diameter of each collar chamber bearing 7 and 8, respectively, and two corresponding stepped decreases in the diameter of the bearing housing 2, two collar chambers 13, 14 are obtained. These chambers 13, 14 each communicates with an outlet from a pilot valve 17 by means of a channel $2f$ and $2g$, respectively, in the bearing housing and the circuits 15 and 16. The pilot valve maintains a certain hydraulic fluid pressure in each chamber by means of the hydraulic fluid flows A and B, respectively. Each collar chamber bearing 7, 8 is applied to its adherent pressure surface $5a$ and $6a$ by means of this pressure. The chambers 13, 14 are sealed by means of gasket rings 9.

The pilot valve 17 is supplied with hydraulic fluid over a circuit 18 from a hydraulic pump 20, which is controlled by a motor.

The pilot valve 17 is arranged to be controlled by means 21, which senses the axial position of the axle 1. The output controls the slide of the pilot valve 17 over an amplifier 22. When an axial displacement results from a change in axial load, the slide of the pilot valve 17 is influenced by the output from the sensor means 21 in the way that the slide is forced out of its normal balanced position, thereby redistributing pressure and quantity of fluid to the collar chambers 13, 14 so that a balanced position is reinstated.

On the other hand, if a permanent axial displacement of the axle 1 is desirable, i.e. a new balanced position for the axle, this can be achieved through mechanical alteration of the reference for the position sensor means 21, e.g. by means of a stepping motor or by electrically influencing the output of the position sensor means 21, altering the amplification factor for the amplifier 22. The function of the pilot valve 17 can alternatively be performed by microprocessor controlled means for control of pressure and of supplied quantity of fluid in each collar chamber 13, 14. The microprocessor continuously receives information regarding the axial position of the axle 1.

Finally, the hydrostatic thrust and radial bearings can be maintained in a mechanically prestressed position by means of a spring 23 to avoid separation of the pressure surfaces 5a, 7a and 6a, 8a when the system is not under pressure.

I claim:

1. Radial and thrust bearing system for a main load-bearing shaft (1) of an axial mill refiner with two hydrostatic, radial and thrust bearings (3,4), axially movable relative to a surrounding bearing housing (2), and each comprising a flange (5,6) joined to the shaft (1) and having a pressure surface (5a,6a), a ring chamber bearing (7,8), which has a surface (7a,8a) facing the pressure surface (5a,6a), and an annular groove (7b,8b) therein, said surface (7a,8a) forming with the pressure surface (5a,6a) inner and outer sealing gaps on either side of the annular groove and said groove with the pressure surface (5a,6a) forming a ring chamber (7b,8b) to which hydraulic fluid is fed under pressure from a source of hydraulic fluid and said ring chamber bearing (7,8) forming with the bearing housing (2) a chamber (13,14) hydraulically pressurized, said chamber pressing the ring chamber bearing (7,8) against the pressure surface (5a,6a), whereupon the two ring chamber bearings (7,8) are pressed in mutually opposite directions by means of a control valve (17) disposed, in cooperation with a sensor (21) sensing the position of the shaft (1) relative to the bearing housing (2), to control the amount of hydraulic fluid supplied to each chamber (13,14) and the hydraulic pressure acting on each bearing (3,4) to permit taking up of loads varying in size and direction on the shaft (1) while retaining axial displaceability thereof, wherein at least one of the flanges (5,6) can be removed from the shaft (1) and that the pressure surfaces (5a,6a) face in mutually opposite directions and each form an angle with the shaft which is essentially non-perpendicular (90°).

2. Radial and thrust bearing system according to claim 1, wherein the annular groove (7b,8b) is divided into a number of separate pockets each fed with hydraulic fluid under pressure from a source of hydraulic fluid.

3. Radial and thrust bearing system according to claim 1 wherein the pressure surfaces (5a,6a) face towards each other, i.e. the forces acting from the hydrostatic bearings on the shaft (1) are directed away from each other.

4. Radial and thrust bearing system according to claim 3, wherein the pressure surfaces (5a,6a) each form an angle of between 15° and 75° with the shaft (1).

* * * * *